United States Patent
Kumar et al.

(10) Patent No.: US 11,800,500 B2
(45) Date of Patent: Oct. 24, 2023

(54) DESCRIPTOR AGGREGATION ACROSS MULTIPLE TRANSMISSION TIME INTERVALS

(71) Applicant: QUALCOMM Incorporated, San Diego, CA (US)

(72) Inventors: Akshay Kumar, San Diego, CA (US); Arnaud Meylan, San Diego, CA (US); Xing Chen, San Diego, CA (US); Shailesh Maheshwari, San Diego, CA (US); Lulu Wang, San Diego, CA (US); Ashwin Raman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/335,001

(22) Filed: May 31, 2021

(65) Prior Publication Data
US 2022/0386303 A1    Dec. 1, 2022

(51) Int. Cl.
*H04W 72/0446* (2023.01)
*H04W 80/02* (2009.01)

(52) U.S. Cl.
CPC ....... *H04W 72/0446* (2013.01); *H04W 80/02* (2013.01)

(58) Field of Classification Search
CPC .......................... H04W 72/0446; H04W 80/02
USPC .......................................................... 370/336
See application file for complete search history.

(56) References Cited

U.S. PATENT DOCUMENTS

| | | | |
|---|---|---|---|
| 10,271,243 B2* | 4/2019 | Phuyal | H04W 28/0819 |
| 2015/0085878 A1* | 3/2015 | Kangarlou | H04L 49/9047 |
| | | | 370/465 |
| 2016/0380861 A1 | 12/2016 | Ali et al. | |
| 2018/0324821 A1* | 11/2018 | Dai | H04L 5/001 |
| 2020/0382397 A1* | 12/2020 | Adams | H04L 43/0829 |

OTHER PUBLICATIONS

International Search Report and Written Opinion—PCT/US2022/072622—ISA/EPO—dated Sep. 12, 2022.

* cited by examiner

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a wireless communication device may receive protocol data units (PDUs) in multiple TTIs (e.g., slots). The wireless communication device may generate, for each TTI of the multiple TTIs, a descriptor that identifies serial numbers (SNs) of PDUs that are received in the TTI. The wireless communication device may aggregate the descriptors for the multiple TTIs into an aggregated descriptor that identifies the SNs of the PDUs across the multiple TTIs. The wireless communication device may process the PDUs received in the multiple TTIs based at least in part on the aggregated descriptor. Numerous other aspects are described.

30 Claims, 7 Drawing Sheets

… (1)
DESCRIPTOR AGGREGATION ACROSS MULTIPLE TRANSMISSION TIME INTERVALS

FIELD OF THE DISCLOSURE

Aspects of the present disclosure generally relate to wireless communication and to techniques and apparatuses for aggregating descriptors across multiple transmission time intervals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes receiving protocol data units (PDUs) in multiple transmission time intervals (TTIs) and generating, for each TTI of the multiple TTIs, a descriptor that identifies serial numbers (SNs) of PDUs that are received in the TTI. The method may include aggregating the descriptors for the multiple TTIs into an aggregated descriptor that identifies the SNs of the PDUs across the multiple TTIs and processing the PDUs received in the multiple TTIs based at least in part on the aggregated descriptor.

In some aspects, a wireless communication device for wireless communication includes a memory and one or more processors, coupled to the memory, configured to receive PDUs in multiple TTIs, generate, for each TTI of the multiple TTIs, a descriptor that identifies SNs of PDUs that are received in the TTI, aggregate the descriptors for the multiple TTIs into an aggregated descriptor that identifies the SNs of the PDUs across the multiple TTIs, and process the PDUs received in the multiple TTIs based at least in part on the aggregated descriptor.

In some aspects, a non-transitory computer-readable medium storing a set of instructions for wireless communication includes one or more instructions that, when executed by one or more processors of a wireless communication device, cause the wireless communication device to receive PDUs in multiple TTIs, generate, for each TTI of the multiple TTIs, a descriptor that identifies SNs of PDUs that are received in the TTI, aggregate the descriptors for the multiple TTIs into an aggregated descriptor that identifies the SNs of the PDUs across the multiple TTIs, and process the PDUs received in the multiple TTIs based at least in part on the aggregated descriptor.

In some aspects, an apparatus for wireless communication includes means for receiving PDUs in multiple TTIs; means for generating, for each TTI of the multiple TTIs, a descriptor that identifies SNs of PDUs that are received in the TTI, means for aggregating the descriptors for the multiple TTIs into an aggregated descriptor that identifies the SNs of the PDUs across the multiple TTIs, and means for processing the PDUs received in the multiple TTIs based at least in part on the aggregated descriptor.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
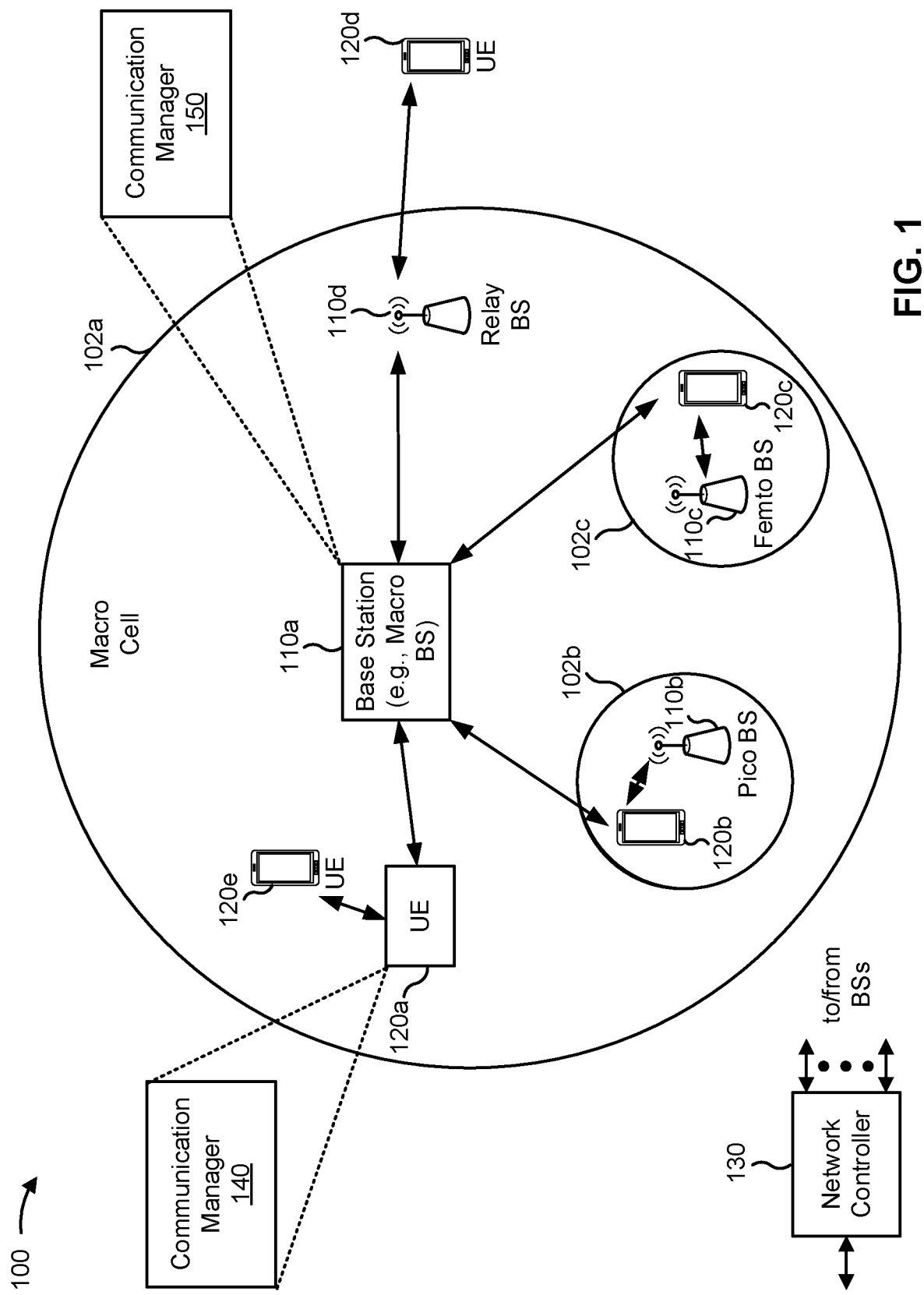
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the wireless communication device may include a communication manager 140 or 150. As described in more detail elsewhere herein, the communication manager 140 or 150 may receive protocol data units (PDUs) in multiple transmission time intervals (TTIs), generate, for each TTI of the multiple TTIs, a descriptor that identifies serial numbers (SNs) of PDUs that are received in the TTI, aggregate the descriptors for the multiple TTIs into an aggregated descriptor that identifies the SNs of the PDUs across the multiple TTIs, and process the PDUs received in the multiple TTIs based at least in part on the aggregated descriptor. Additionally, or alternatively, the communication manager 140 or 150 may perform one or more other operations described herein.

As indicated above, FIG. 1 is provided as an example. Other examples may differ from what is described with regard to FIG. 1.

Figure 2:
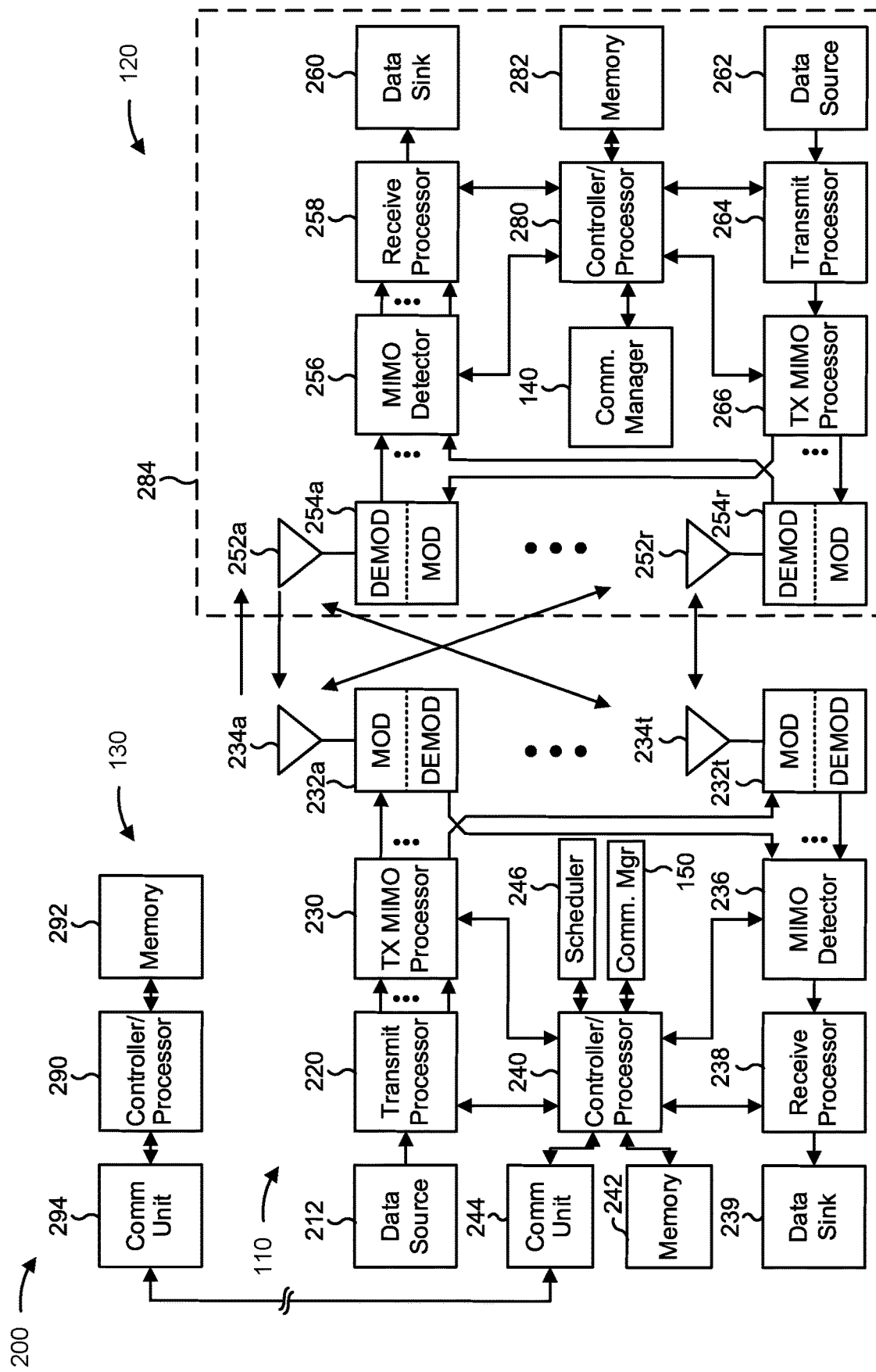
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-7).

A controller/processor of a wireless communication device, such as controller/processor 240 of base station 110, controller/processor 280 of UE 120, and/or any other component(s) of FIG. 2 may perform one or more techniques associated with aggregating descriptors across multiple TTIs, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the wireless communication device includes means for receiving PDUs in multiple TTIs, means for generating, for each TTI of the multiple TTIs, a descriptor that identifies SNs of PDUs that are received in the TTI, means for aggregating the descriptors for the multiple TTIs into an aggregated descriptor that identifies the SNs of the PDUs across the multiple TTIs, and/or means for processing the PDUs received in the multiple TTIs based at least in part on the aggregated descriptor. In some aspects, the means for the wireless communication device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regards to FIG. 2.

Figure 3:
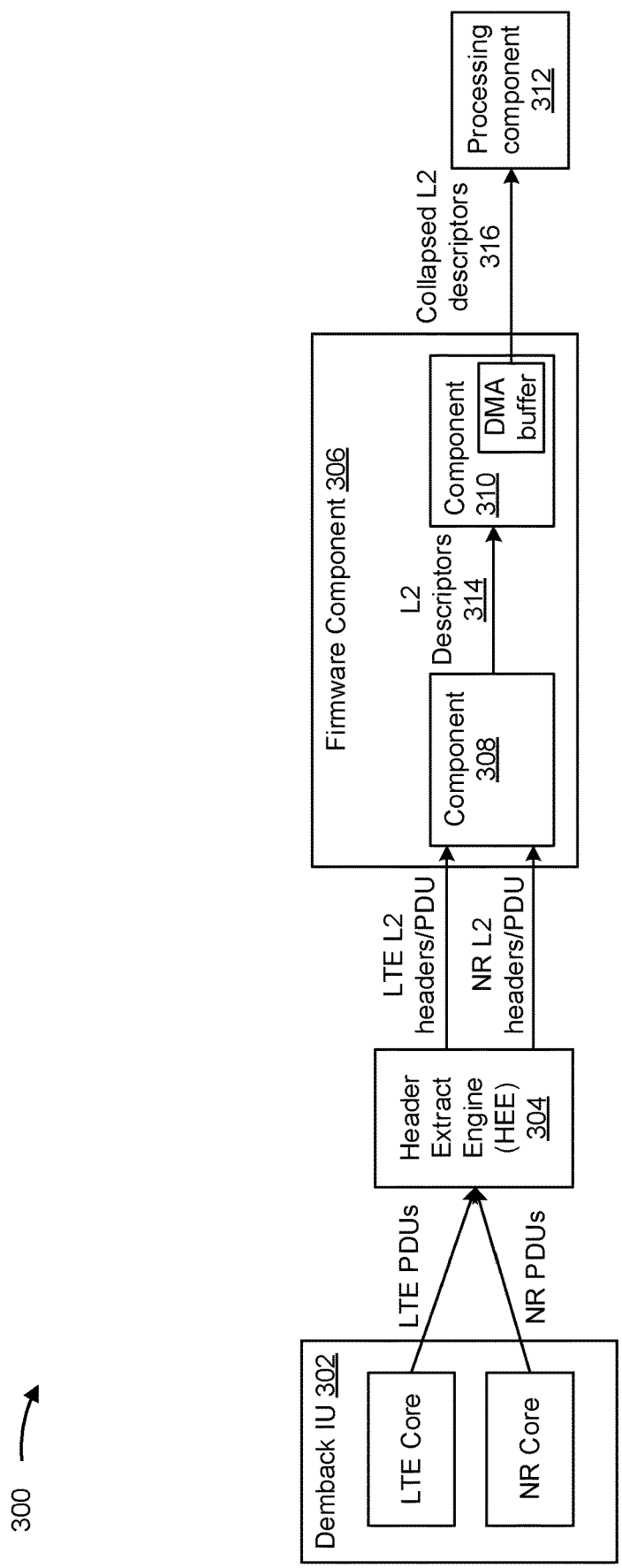
FIG. 3 is a diagram illustrating an example of a system for processing headers, in accordance with the present disclosure.

FIG. 3 is a diagram illustrating an example 300 of a system for processing headers, in accordance with the present disclosure. The system (e.g., for a modem) may be included in a wireless communication device (e.g., a UE 120, a CPE, base station 110) that receives PDUs in transport blocks (TBs) from other wireless communication devices. The wireless communication device may operate in a wireless network, such as wireless network 100.

The wireless communication device may receive and demodulate PDUs. The PDUs may have headers (e.g., radio link control (RLC) headers and packet data convergence protocol (PDCP) headers) with information that is used for processing the PDUs. The system shown by example 300 extracts the headers, generates a descriptor (metadata) for the headers for each TTI, collapses or compresses the descriptors, and provides the descriptors to a processing component. The processing component may use the descriptors to process the PDUs, including checking integrity protection for the PDUs, deciphering the PDUs, or reordering the PDUs. These actions may help with processing of the data payloads of the PDUs.

In more detail, example 300 shows a demodulation back-end (demback) instruction unit (IU) 302, a header extraction engine (HEE) 304, and a component 306, which may be a firmware component that executes instructions. In some aspects, component 306 may be a hardware component or a software component. Component 306 may include a first component 308 and a second component 310. In some aspects, component 306, component 308, and component 310 may be one component or another combination of components. Example 300 also shows a processing component 312, which may be a software processing component. In some aspects, the processing component 312 may be a firmware component, or a hardware component. The demback IU 302 may perform a cyclic redundancy check (CRC) check on Long Term Evolution (LTE) and NR PDUs received in each TTI (e.g., slot). If the CRC is successful, the demback IU 302 may provide the PDUs to the HEE 304. The HEE 304 may extract the headers from the PDUs and provide them to component 308 of component 306. Component 306 may generate descriptors (metadata) for the headers. A descriptor may identify a group of SNs for PDUs received in a slot, for example, including a starting SN, an ending SN, and/or a quantity of SNs. The descriptors may include RLC descriptors and/or PDCP descriptors. Component 310 may collapse the descriptors and store the collapsed descriptors 316 in a direct memory access (DMA) buffer. Component 310 may provide the collapsed descriptors 316 to the processing component 312.

Component 308 may be a first component of a wireless communication device, component 310 may be a second component, and the processing component 312 may be considered a third component. Component 308 and component 310 may include firmware, and the processing component 312 may include firmware or may include software executed by a processor. The descriptors may help to alleviate the load on the processing component 312 by avoiding per-packet processing if the L2 packets are continuous in sequence number and are the same size.

The processing component 312 may share processing resources (measured as available massively parallel processing units, or Mega Packets Per Second (MPPS)) between a modem and other applications (e.g., a location service application, a video application, an audio application). If the wireless communication device is operating in an Evolved Universal Terrestrial Radio Access (E-UTRA)-NR Dual Connectivity (EN-DC) mode, the PDUs may be reordered across LTE and NR legs. Reordering may involve building a single ordered list of packets in the processing component 312. The efficiency of processing component 312 may be increased by amortizing the cost of inserting the descriptor into the list across multiple packets. The efficiency of the descriptors may correspond to how fast a scheduler switches data between LTE and NR. If the scheduler causes large chunks of data (several milliseconds) for each leg, this may consume memory and increase latency.

Component 308 and component 310 may sequentially process LTE and NR traffic. Component 308 may prepare and accumulate RLC/PDCP descriptors for each PDU that is received until a memory of component 310 reaches a storage limit or a last PDU is processed. Component 308 may provide the descriptors to component 310 to collapse before providing the collapsed descriptors 316 to the processing component 312. However, the more descriptors that the processing component 312 has to process (e.g., list insertion), the more processing resources that are consumed.

As indicated above, FIG. 3 is provided as an example. Other examples may differ from what is described with regards to FIG. 3.

Figure 4:
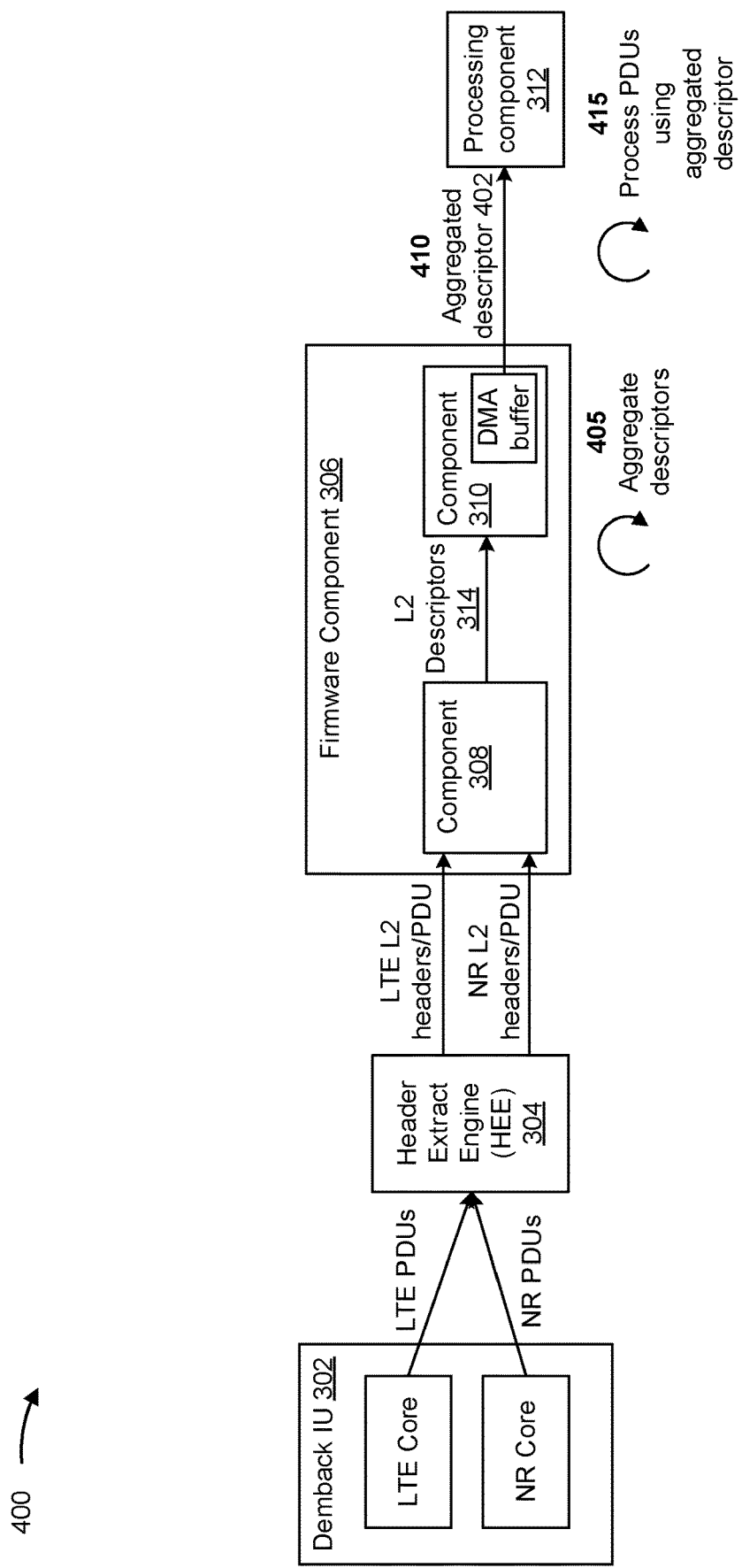
FIG. 4 is a diagram illustrating an example of aggregating descriptors, in accordance with the present disclosure.

FIG. 4 is a diagram illustrating an example 400 of aggregating descriptors, in accordance with the present disclosure. Example 400 shows the components described in connection with example 300.

According to various aspects described herein, the wireless communication device may aggregate descriptors for PDUs across multiple TTIs (e.g., slots) into an aggregated descriptor 402. The descriptors may be aggregated by component 310, and component 310 may provide the aggregated descriptor 402 to the processing component 312. The aggregated descriptor 402 may indicate a group of PDUs, where the PDUs have corresponding SNs. For example, the aggregated descriptor 402 may indicate a starting SN for a starting PDU of the group, an ending SN for an ending PDU of the group, a quantity of SNs for the group, or another indicator of a size or SN range of the group. In this way, the processing component 312 inserts fewer descriptors in a list for processing the PDUs while obtaining the same amount of information. This increase in descriptor efficiency conserves processing resources. The aggregated descriptor 402 may also group PDUs to help with in-order PDU processing when a PDU arrives later (SNs are missing or arrive out of order). For example, if SNs 451-500 are received after SN 901, SNs may be grouped such that SNs 451-500 are included in the same group as SN 901.

As shown by example 400, component 310 may receive descriptors 314 from component 308. As shown by reference number 405, component 310 may aggregate the descriptors. For example, if a first descriptor of the descriptors 314 provides information for SNs 1-200, a second descriptor provides information for SNs 201-400, and a third descriptor provides information for SNs 401-450, the aggregated descriptor 402 may be a single descriptor that provides information for SNs 1-450. The aggregated descriptor 402 may be stored in a DMA buffer for delivery to the processing component 312.

Component 310 may group SNs based on a blocking SN, which may be an SN that is used to mark a start of a block or grouping of SNs. The blocking SN may be identified based at least in part on a determination that some SNs are missing or arrived late. For example, if some SNs are missing, a blocking SN may be set and the group of SNs to be associated with an aggregated descriptor may be enlarged to include the missing SNs that arrive later. In some aspects, the blocking SN may be identified based at least in part on a reordering parameter (e.g., PDCP SN RX_REORD) or the first missing SN (e.g., PDCP SN RX_DELIV). The blocking SN may also be set based at least in part on one half of a PDCP reordering window size. By grouping SNs with a blocking SN, the SNs may be reordered and the aggregated descriptor 402 may reflect the reordering. This may reduce the processing resources used by the processing component 312 for reordering and for handling late arriving SNs. As a result, the processing component 312 may increase efficiency without increasing the memory that is needed for component 306.

In some aspects, if descriptor aggregation is not started, the wireless communication device may start the descriptor aggregation (or grouping of PDUs for descriptor aggregation) if a blocking SN is identified and if PDUs received in a current TTI have SNs that are equal to or greater than the blocking SN (e.g., for RX_REORD) or greater than the blocking SN (e.g., for RX_DELIV). Aggregation may be stopped if an SN for a received PDU is less than a blocking SN (e.g., for RX_REORD), less than or equal to the blocking SN (e.g., for RX_DELIV), or if the blocking SN is undefined. Aggregation may be stopped (current group ended and new group started) if a storage level of a memory for component 310 satisfies a storage threshold (e.g., reaches a storage limit).

In some aspects, a group of SNs may be specified as a quantity of TTIs. For example, every 4 slots may be a group and the aggregated descriptor 402 may be an aggregation of descriptors for the 4 slots. The specified quantity may be obtained from stored configuration information or indicated by the network. The use of a specified quantity of TTIs may be based on whether the wireless communication device is operating in FR2. Using a specified quantity of TTIs may have little impact on end-to-end packet latency, as an internet protocol accelerator (IPA) accumulates and delivers data in traffic bursts to an application protocol component or a host.

As shown by reference number 410, component 310 may provide the aggregated descriptor 402 to the processing component 312. As shown by reference number 415, the processing component 312 may use the aggregated descriptor 402 to process the PDUs. This may include checking integrity protection for the PDUs, deciphering the PDUs, or reordering the PDUs. By processing the single aggregated descriptor 402 for multiple TTIs rather than processing multiple descriptors for the multiple TTIs, the processing component 312 may conserve processing resources.

In some aspects, a group of SNs may be aligned with a temporal parameter. The temporal parameter may be an IPA accumulation interval for PDUs being passed between a modem and a host. The wireless communication device may enable descriptor aggregation if the temporal parameter satisfies a temporal parameter threshold (e.g., is below the temporal parameter threshold). This may lead to significant SN grouping gain without incurring additional end-to-end packet delay. This may also be useful for peak throughput EN-DC scenarios where load optimization of the processing component 312 will help to deliver a high throughput.

In some aspects, the processing component 312 may determine a mode of operation for component 306 with regard to enabling or disabling grouping for cross-TTI or cross-slot descriptor aggregation. The processing component 312 may enable or disable the grouping. For example, grouping for descriptor aggregation may be enabled if a processing parameter satisfies a processing threshold (e.g., MPPS exceed a threshold MPPS value). Note that this may be applicable if the wireless communication device is operating at least in an EN-DC mode, an NR carrier aggregation mode, an LTE stand-alone mode, or an NR stand-alone mode.

Grouping for descriptor aggregation may be enabled if there is a block error rate (BLER) on an LTE leg and/or an NR leg or if the BLER satisfies a BLER threshold (e.g., reaches a maximum BLER). The grouping may be possible on both legs. If there is no BLER on either leg or if the BLER satisfies another BLER threshold (e.g., minimum BLER), grouping for descriptor aggregation (e.g., on NR leg) may be enabled only when the leg that is ahead with SNs (e.g., NR leg) has a higher numerology than the leg that is behind with SNs (e.g., LTE leg). For example, if the LTE leg (with numerology of 15 kilohertz (kHz) subcarrier spacing (SCS)) has a block of SNs 1-10 and the NR leg (with numerology of 30 kHz SCS) has a block of SNs 11-55 and a block of SNs 55-100 in the same slot, grouping is possible on the NR leg. However, if the LTE leg has a block of SNs 91-100 and the NR leg has a block of SNs 1-45 and a block of SNs 46-90 in the same slot, grouping on the NR leg may not be possible because the NR leg is behind the LTE leg. Grouping on the LTE leg may not be possible if the LTE leg has a lower numerology.

Grouping for aggregation may be disabled if one or more of a throughput parameter satisfies a throughput threshold (e.g., throughput is less than peak throughput for an envelope mode, available double data rate (DDR)), or a ping test is to be performed. The peak throughput may be multiplied by a specified fraction (i.e., 0<X<1) that controls how aggressive component 310 will approach when to enable of the grouping for descriptor aggregation.

In some embodiments, the processing component 312 may adjust the blocking SN based at least in part on a size and/or status (e.g., storage level) of a PDCP ReOrdering Window (ROW). For example, when the ROW is full or if an overall modem memory level falls below a threshold, the processing component 312 may deliver PDCP PDUs (along with missing SNs) to the host. Component 306 may flush half of the total buffer (i.e., SNs below a half ROW mark, or $SN_{0.5*ROW}$). Component 306 may aggregate descriptors held for aggregation and deliver the aggregated descriptor to the processing component 312 for SNs that are less than or equal to $SN_{0.5*ROW}$. The processing component 312 may update the blocking SN to $SN_{0.5*ROW}$ when the processing component 312 is about to flush the ROW. When the ROW or system memory is freed up, the processing component 312 may update the blocking SN to be an SN indicated by RX_REORD if the SN of RX_REORD is greater than the blocking SN. That is the blocking SN may be the maximum of the SN of RX_REORD and the blocking SN).

In other words, if a PDCP ROW in the processing component 312 becomes full, the processing component 312 may adjust the blocking SN to terminate the current group and start a next group. If the memory of component 306 becomes full, the current group is closed and a next group is started. By providing the processing component 312 a single aggregated descriptor for multiple TTIs, instead of a descriptor for each TTI, the processing component 312 may conserve processing resources.

As indicated above, FIG. 4 is provided as an example. Other examples may differ from what is described with regard to FIG. 4.

Figure 5:
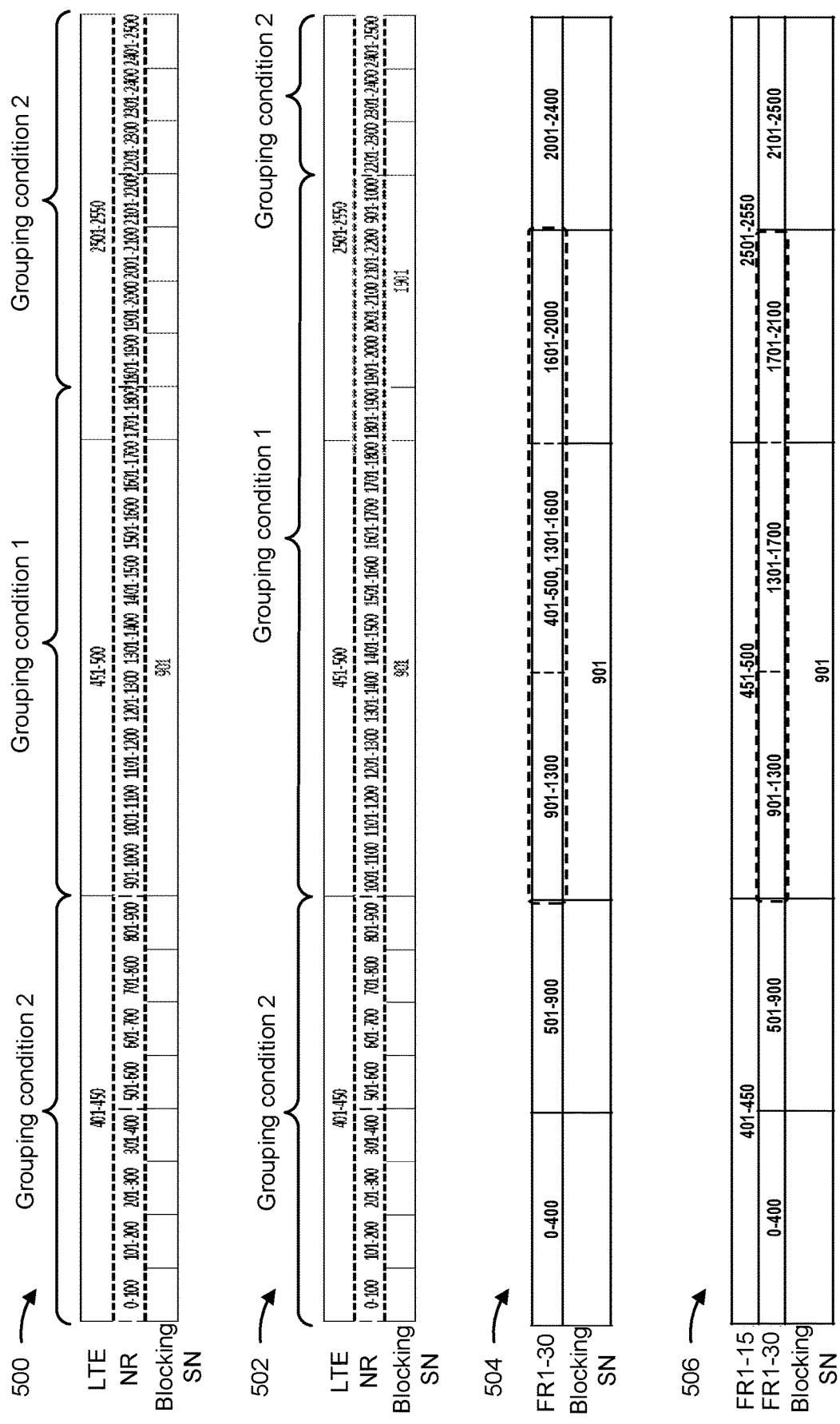
FIG. 5 is a diagram illustrating examples of grouping serial numbers, in accordance with the present disclosure.

FIG. 5 is a diagram illustrating examples 500, 502, 504, and 506 of grouping SNs, in accordance with the present disclosure.

Example 500 shows an example of blocking SNs for grouping SNs for LTE, where some LTE SNs have fallen behind NR SNs, such as millimeter wave (mmW) SNs. There may be no BLER on either the LTE leg or the NR (mmW) leg. Example 500 also shows a group of SNs for a first grouping condition (condition 1) and a second grouping condition (condition 2). Grouping condition 1 may be used to start a group if a blocking SN exists (e.g., SN 901) and all PDUs received in a TTI have SNs that are equal to or greater than the blocking SN. Grouping condition 1 may be applicable to mmW rather than LTE or FR1. Grouping condition 2 may group SNs based on a specified quantity of TTIs (e.g., 4 slots of unconditional grouping). There may be no blocking SN for grouping condition 2.

In some aspects, component 310 may use a blocking SN to start a group of SNs. Component 310 may identify the blocking SN based at least in part on some SNs that are missing or have arrived late. For example, as shown by example 500, if SNs 451-500 are determined to be missing, component 310 may end a current group of SNs and start a new group with a new blocking SN, such as SN 901. The missing SNs 451-500 may then be included in the new group for descriptor aggregation. If the missing SNs arrive on the LTE leg, the processing component 312 may send a stop indication to component 306. Grouping may stop 1 slot after the indication (e.g., at SN 1700).

Example 502 shows an example of blocking SNs for grouping SNs for both an LTE leg and an NR leg, where the SNs reflect a block error rate for NR and some LTE SNs have fallen behind NR SNs (mmW SNs). For example, there may be a HARQ error on the component carrier with SN 901-1000. The grouping condition 1 may be used due to delayed SNs on the LTE leg. Component 306 may deliver descriptors. If the processing component 312 detects missing SNs 901-1000, SN 1901 may be used as a blocking SN. In this way, a group may involve LTE and NR PDUs. SNs 1901 to SN 1000 may be another grouping due to the missing SNs 901-1000 on the NR leg. The SNs 901-1000 may arrive as a HARQ retransmission success within the grouping.

Example 504 shows grouping SNs across TTIs (e.g., slots) for NR standalone (SA) in a carrier aggregation (CA) scenario (30 kHz SCS time division duplex (TDD)). There is no blocking or grouping for SNs 0-900. However, if there is a HARQ error on the component carrier for missing SNs 401-500, the processing component 312 may set blocking SN to SN 901. SNs greater than SN 901 on an NR leg may be grouped. If the missing SNs 401-500 arrive (HARQ retransmission success), there may be no new blocking SN. An indication to stop grouping may be provided at SN 1600. Component 306 may continue the grouping until a slot later (to include SNs 1601-2000), if SNs are contiguous with an aggregated descriptor.

Example 506 shows grouping SNs across TTIs (e.g., slots) for NR SA in a dual connectivity (DC) scenario (15 kHz SCS frequency division duplex (FDD) and 30 kHz SCS TDD) where one leg may be ahead. There is no blocking or grouping for SNs 0-900. However, if the process component 312 detects that SNs 451-500 are missing, the processing component 312 may set a blocking SN to SN 901. SNs greater than SN 901 on an NR leg may be grouped. If the missing SNs 401-500 arrive on an LTE leg, there may be no new blocking SN. An indication to stop grouping may be provided at SN 1700. Component 306 may continue the grouping until a slot later (to include SNs 1701-2100), if SNs are contiguous with an aggregated descriptor.

As indicated above, FIG. 5 provides some examples. Other examples may differ from what is described with regard to FIG. 5.

Figure 6:
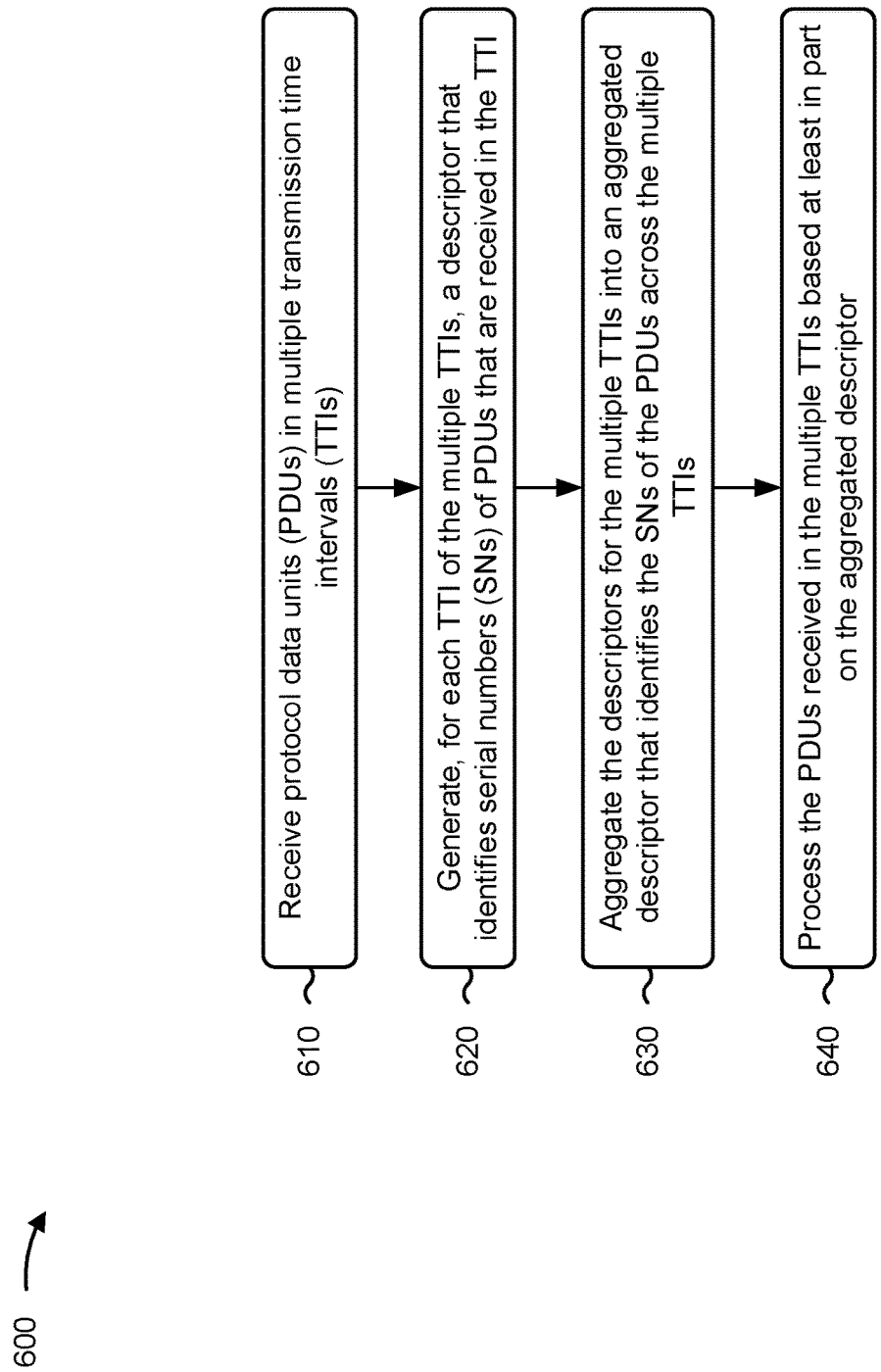
FIG. 6 is a diagram illustrating an example process performed, for example, by a wireless communication device, in accordance with the present disclosure.

FIG. 6 is a diagram illustrating an example process 600 performed, for example, by a wireless communication device, in accordance with the present disclosure. Example process 600 is an example where the wireless communication device (e.g., a UE 120, a CPE, base station 110) performs operations associated with aggregating descriptors across multiple TTIs.

As shown in FIG. 6, in some aspects, process 600 may include receiving PDUs in multiple TTIs (block 610). For example, the wireless communication device (e.g., using communication manager 140 or 150 and/or reception component 702 depicted in FIG. 7) may receive PDUs in multiple TTIs, as described above.

As further shown in FIG. 6, in some aspects, process 600 may include generating, for each TTI of the multiple TTIs, a descriptor that identifies SNs of PDUs that are received in the TTI (block 620). For example, the wireless communication device (e.g., using communication manager 140 or 150 and/or generation component 708 depicted in FIG. 7) may generate, for each TTI of the multiple TTIs, a descriptor that identifies SNs of PDUs that are received in the TTI, as described above.

As further shown in FIG. 6, in some aspects, process 600 may include aggregating the descriptors for the multiple TTIs into an aggregated descriptor that identifies the SNs of the PDUs across the multiple TTIs (block 630). For example, the wireless communication device (e.g., using communication manager 140 or 150 and/or aggregation component 710 depicted in FIG. 7) may aggregate the descriptors for the multiple TTIs into an aggregated descriptor that identifies the SNs of the PDUs across the multiple TTIs, as described above.

As further shown in FIG. 6, in some aspects, process 600 may include processing the PDUs received in the multiple TTIs based at least in part on the aggregated descriptor (block 640). For example, the wireless communication device (e.g., using communication manager 140 or 150 and/or processing component 712 depicted in FIG. 7) may process the PDUs received in the multiple TTIs based at least in part on the aggregated descriptor, as described above.

Process 600 may include additional aspects, such as any single aspect or any combination of aspects described below and/or in connection with one or more other processes described elsewhere herein.

In a first aspect, the aggregating is started if a blocking SN is identified and if PDUs received in a current TTI have SNs that are greater than (or equal to) the blocking SN.

In a second aspect, alone or in combination with the first aspect, the aggregating is stopped if an SN for a received PDU is less than (or equal to) a blocking SN or if the blocking SN is undefined.

In a third aspect, alone or in combination with one or more of the first and second aspects, a quantity of the multiple TTIs for the aggregating is specified in stored configuration information or by a received indication.

In a fourth aspect, alone or in combination with one or more of the first through third aspects, the aggregating is stopped if a storage level satisfies a storage threshold.

In a fifth aspect, alone or in combination with one or more of the first through fourth aspects, process 600 includes identifying a blocking SN based at least in part on a determination that an SN for a PDU is missing or arrived late.

In a sixth aspect, alone or in combination with one or more of the first through fifth aspects, the determination is based at least in part on a reordering parameter or on a lowest or first missing SN that is blocking in order delivery of PDCP service data units (SDUs) to an upper layer.

In a seventh aspect, alone or in combination with one or more of the first through sixth aspects, the aggregating is enabled if a temporal parameter of the PDUs for being moved between a modem and a host satisfies a temporal parameter threshold.

In an eighth aspect, alone or in combination with one or more of the first through seventh aspects, the aggregating is enabled if one or if a block error rate (BLER) satisfies a BLER threshold.

In a ninth aspect, alone or in combination with one or more of the first through eighth aspects, the aggregating is disabled if one or more of a throughput parameter satisfies a throughput threshold, a memory parameter satisfies a memory threshold, or a ping test is to be performed.

In a tenth aspect, alone or in combination with one or more of the first through ninth aspects, the aggregating includes aggregating descriptors for PDUs received via both an LTE network and an NR network.

In an eleventh aspect, alone or in combination with one or more of the first through tenth aspects, processing the PDUs includes one or more of checking integrity protection, deciphering, or reordering the PDUs.

In a twelfth aspect, alone or in combination with one or more of the first through eleventh aspects, the descriptors are generated in a first component of the wireless communication device, the descriptors are aggerated in a second component of the wireless communication device, and the aggregated descriptor is used for processing the PDUs in a third component of the wireless communication device.

In a thirteenth aspect, alone or in combination with one or more of the first through twelfth aspects, process 600 includes adjusting a blocking SN based at least in part on a size or status of a PDCP ROW.

In a fourteenth aspect, alone or in combination with one or more of the first through thirteenth aspects, the wireless communication device is a UE.

In a fifteenth aspect, alone or in combination with one or more of the first through fourteenth aspects, the wireless communication device is a CPE.

In a sixteenth aspect, alone or in combination with one or more of the first through fifteenth aspects, the wireless communication device is a base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
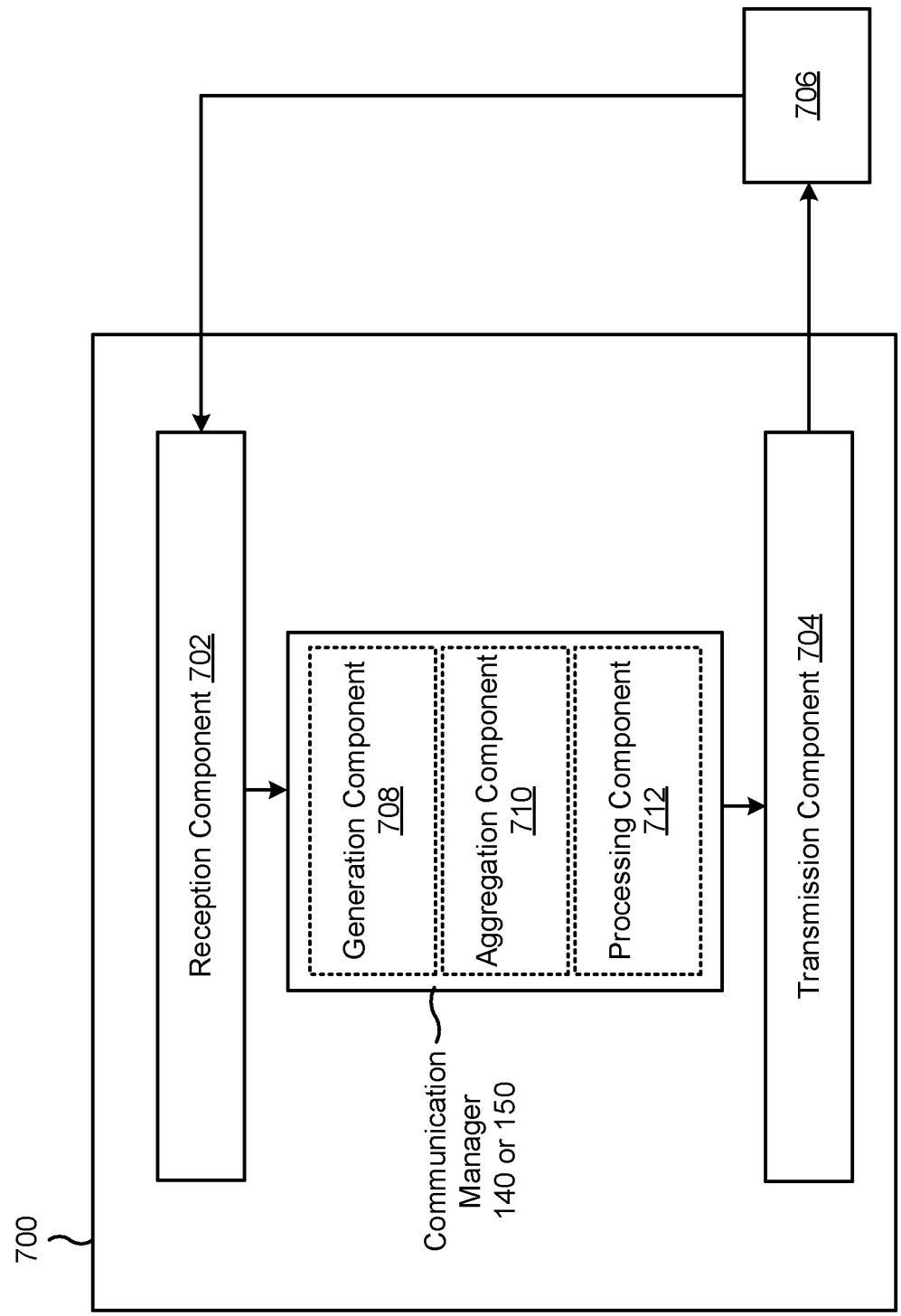
FIG. 7 is a block diagram of an example apparatus for wireless communication.

FIG. 7 is a block diagram of an example apparatus 700 for wireless communication. The apparatus 700 may be a wireless communication device (e.g., a UE 120, a CPE, base station 110), or a wireless communication device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140 or 150. The communication manager 140 or 150 may include a generation component 708, an aggregation component 710, and/or a processing component 712, among other examples.

In some aspects, the apparatus 700 may be configured to perform one or more operations described herein in connection with FIGS. 1-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the wireless communication device described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the wireless communication device described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the wireless communication device described in connection with FIG. 2. In some aspects, the transmission component 704 may be co-located with the reception component 702 in a transceiver.

The reception component 702 may receive PDUs in multiple TTIs. The generation component 708 may generate, for each TTI of the multiple TTIs, a descriptor that identifies SNs of PDUs that are received in the TTI. The aggregation component 710 may aggregate the descriptors for the multiple TTIs into an aggregated descriptor that identifies the SNs of the PDUs across the multiple TTIs. The processing component 712 may process the PDUs received in the multiple TTIs based at least in part on the aggregated descriptor. The aggregation component 710 may identify a blocking SN based at least in part on a determination that an SN for a PDU is missing or arrived late.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a wireless communication device, comprising: receiving protocol data units (PDUs) in multiple TTIs; generating, for each TTI of the multiple TTIs, a descriptor that identifies serial numbers (SNs) of PDUs that are received in the TTI; aggregating the descriptors for the multiple TTIs into an aggregated descriptor that identifies the SNs of the PDUs across the multiple TTIs; and processing the PDUs received in the multiple TTIs based at least in part on the aggregated descriptor.

Aspect 2: The method of Aspect 1, wherein the aggregating is started if a blocking SN is identified and if PDUs received in a current TTI have SNs that are greater than the blocking SN.

Aspect 3: The method of Aspect 1 or 2, wherein the aggregating is stopped if an SN for a received PDU is less than or equal to a blocking SN or if the blocking SN is undefined.

Aspect 4: The method of any of Aspects 1-3, wherein a quantity of the multiple TTIs for the aggregating is specified in stored configuration information or by a received indication.

Aspect 5: The method of any of Aspects 1-4, wherein the aggregating is stopped if a storage level satisfies a storage threshold.

Aspect 6: The method of any of Aspects 1-5, further comprising identifying a blocking SN based at least in part on a determination that an SN for a PDU is missing or arrived late.

Aspect 7: The method of Aspect 6, wherein the determination is based at least in part on a reordering parameter or on a lowest or first missing SN that is blocking in order delivery of PDCP service data units (SDUs) to an upper layer.

Aspect 8: The method of any of Aspects 1-7, wherein the aggregating is enabled if a temporal parameter of the PDUs for being moved between a modem and a host satisfies a temporal parameter threshold.

Aspect 9: The method of any of Aspects 1-8, wherein the aggregating is enabled if one or more of a processing parameter satisfies a processing threshold or if a block error rate (BLER) satisfies a BLER threshold.

Aspect 10: The method of any of Aspects 1-9, wherein the aggregating is disabled if one or more of a throughput parameter satisfies a throughput threshold, a memory parameter satisfies a memory threshold, or a ping test is to be performed.

Aspect 11: The method of any of Aspects 1-10, wherein the aggregating includes aggregating descriptors for PDUs received via both a Long Term Evolution network and a New Radio network.

Aspect 12: The method of any of Aspects 1-11, wherein processing the PDUs includes one or more of checking integrity protection, deciphering, or reordering the PDUs.

Aspect 13: The method of any of Aspects 1-12, wherein the descriptors are generated in a first component of the wireless communication device, the descriptors are aggerated in a second component of the wireless communication device, and the aggregated descriptor is used for processing the PDUs in a third component of the wireless communication device.

Aspect 14: The method of any of Aspects 1-12, further comprising adjusting a blocking SN based at least in part on a size or status of a packet data convergence protocol reordering window.

Aspect 15: The method of any of Aspects 1-14, wherein the wireless communication device is a user equipment.

Aspect 16: The method of any of Aspects 1-14, wherein the wireless communication device is a computer premises equipment.

Aspect 17: The method of any of Aspects 1-14, wherein the wireless communication device is a base station.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 18: A device for wireless communication, comprising a memory and one or more processors coupled to the memory, the one or more processors configured to perform the method of one or more of Aspects 1-17.

Aspect 19: An apparatus for wireless communication, comprising at least one means for performing the method of one or more of Aspects 1-17.

Aspect 20: A non-transitory computer-readable medium storing code for wireless communication, the code comprising instructions executable by a processor to perform the method of one or more of Aspects 1-17.

Aspect 21: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
 a memory; and
 one or more processors, coupled to the memory, configured to:
  receive protocol data units (PDUs) in multiple transmission time intervals (TTIs);
  generate descriptors for the multiple TTIs comprising a descriptor for each TTI of the multiple TTIs, wherein the descriptor for a particular TTI of the multiple TTIs identifies serial numbers (SNs) of PDUs that are received in the particular TTI;
  aggregate the descriptors for the multiple TTIs into an aggregated descriptor that identifies the SNs of the PDUs across the multiple TTIs; and
  process the PDUs received in the multiple TTIs based at least in part on the aggregated descriptor.

2. The wireless communication device of claim 1, wherein the aggregating is started if a blocking SN is identified and if PDUs received in a current TTI have SNs that are greater than the blocking SN.

3. The wireless communication device of claim 1, wherein the aggregating is stopped if an SN for a received PDU is less than or equal to blocking SN or if the blocking SN is undefined.

4. The wireless communication device of claim 1, wherein a quantity of the multiple TTIs for the aggregating is specified in stored configuration information or by a received indication.

5. The wireless communication device of claim 1, wherein the aggregating is stopped if a storage level satisfies a storage threshold.

6. The wireless communication device of claim 1, wherein the one or more processors are configured to identify a blocking SN based at least in part on a determination that an SN for a PDU is missing or arrived late.

7. The wireless communication device of claim 6, wherein the determination is based at least in part on a reordering parameter or on a lowest or first missing SN that is blocking in order delivery of packet data convergence protocol service data units to an upper layer.

8. The wireless communication device of claim 1, wherein the aggregating is enabled if a temporal parameter of the PDUs for being moved between a modem and a host satisfies a temporal parameter threshold.

9. The wireless communication device of claim 1, wherein the aggregating is enabled if one or more of a processing parameter satisfies a processing threshold or if a block error rate (BLER) satisfies a BLER threshold.

10. The wireless communication device of claim 1, wherein the aggregating is disabled if one or more of a throughput parameter satisfies a throughput threshold, a memory parameter satisfies a memory threshold, or a ping test is to be performed.

11. The wireless communication device of claim 1, wherein the one or more processors are configured to aggregate descriptors for PDUs received via both a Long Term Evolution network and a New Radio network.

12. The wireless communication device of claim 1, wherein the one or more processors, to process the PDUs, are configured to check integrity protection, decipher, or reorder the PDUs.

13. The wireless communication device of claim 1, wherein the descriptors for the multiple TTIs are generated in a first component of the wireless communication device, the descriptors for the multiple TTIs are aggregated in a second component of the wireless communication device, and the aggregated descriptor is used for processing the PDUs in a third component of the wireless communication device.

14. The wireless communication device of claim 1, further comprising adjusting a blocking SN based at least in part on a size or status of a packet data convergence protocol reordering window.

15. The wireless communication device of claim 1, wherein the wireless communication device is a user equipment.

16. The wireless communication device of claim 1, wherein the wireless communication device is a computer premises equipment.

17. The wireless communication device of claim 1, wherein the wireless communication device is a base station.

18. A method of wireless communication performed by a wireless communication device, comprising:
receiving protocol data units (PDUs) in multiple transmission time intervals (TTIs);
generating descriptors for the multiple TTIs comprising a descriptor for each TTI of the multiple TTIs, wherein the descriptor for a particular TTI of the multiple TTIs identifies serial numbers (SNs) of PDUs that are received in the particular TTI;
aggregating the descriptors for the multiple TTIs into an aggregated descriptor that identifies the SNs of the PDUs across the multiple TTIs; and
processing the PDUs received in the multiple TTIs based at least in part on the aggregated descriptor.

19. The method of claim 18, wherein the aggregating is started if a blocking SN is identified and if PDUs received in a current TTI have SNs that are equal to or greater than the blocking SN.

20. The method of claim 18, wherein the aggregating is stopped if an SN for a received PDU is less than or equal to a blocking SN or if the blocking SN is undefined.

21. The method of claim 18, wherein a quantity of the multiple TTIs for the aggregating is specified in stored configuration information or by a received indication.

22. The method of claim 18, wherein the aggregating is stopped if a storage level satisfies a storage threshold.

23. The method of claim 18, further comprising identifying a blocking SN based at least in part on a determination that an SN for a PDU is missing or arrived late.

24. The method of claim 23, wherein the determination is based at least in part on a reordering parameter or on a lowest or first missing SN that is blocking in order delivery of packet data convergence protocol service data units to an upper layer.

25. The method of claim 18, wherein the aggregating is enabled if a temporal parameter of the PDUs for being moved between a modem and a host satisfies a temporal parameter threshold.

26. The method of claim 18, wherein the aggregating is enabled if one or more of a processing parameter satisfies a processing threshold or if a block error rate (BLER) satisfies a BLER threshold.

27. The method of claim 18, wherein the aggregating is disabled if one or more of a throughput parameter satisfies a throughput threshold, a memory parameter satisfies a memory threshold, or a ping test is to be performed.

28. The method of claim 18, wherein the aggregating includes aggregating descriptors for PDUs received via both a Long Term Evolution network and a New Radio network.

29. The method of claim 18, wherein processing the PDUs includes one or more of checking integrity protection, deciphering, or reordering the PDUs.

30. The method of claim 18, wherein the descriptors for the multiple TTIs are generated in a first component of the wireless communication device, the descriptors for the multiple TTIs are aggregated in a second component of the wireless communication device, and the aggregated descriptor is used for processing the PDUs in a third component of the wireless communication device.

* * * * *